Oct. 25, 1955  H. GERSON  2,721,498
EYEGLASS WITH EXTENSIBLE TEMPLES
Filed Nov. 2, 1953
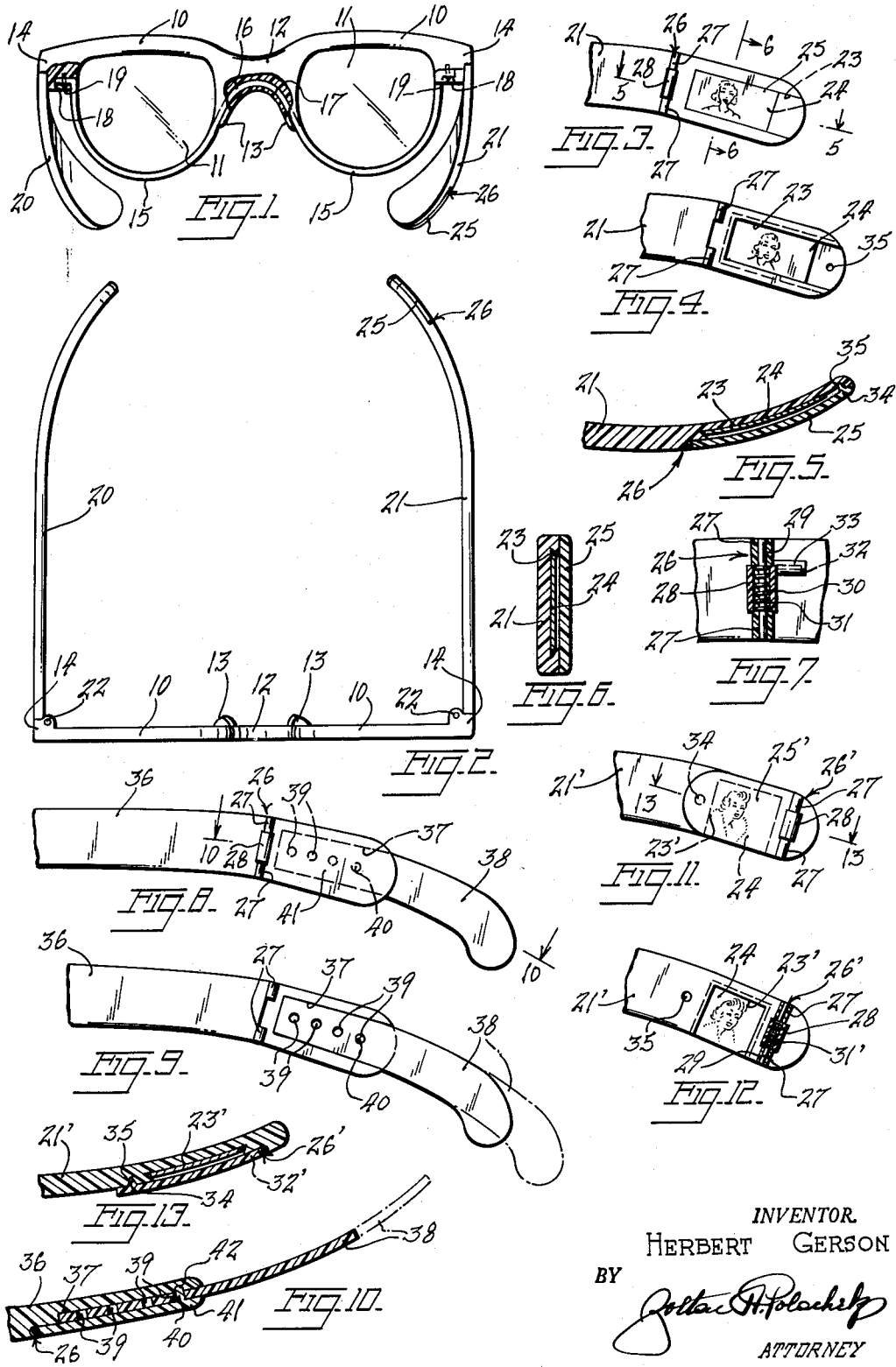
INVENTOR.
HERBERT GERSON
BY
ATTORNEY

United States Patent Office 2,721,498
Patented Oct. 25, 1955

2,721,498

EYEGLASS WITH EXTENSIBLE TEMPLES

Herbert Gerson, New York, N. Y.

Application November 2, 1953, Serial No. 389,594

1 Claim. (Cl. 88—52)

This invention relates generally to ophthalmic mountings and, more particularly, to a new and useful improvement in a combined eyeglass and picture frame.

A principal object of the present invention is to provide an eyeglass frame with means for mounting a picture, photograph or the like.

Another object of the invention is to provide an eyeglass frame with a mounting for supporting and exposing a photograph or the like to view and preserving the same from spoilage and damage.

A further object of the invention is to provide an eyeglass frame with a mounting for a photograph or the like which gives a picture frame effect and enhances the appearance of the photograph.

Yet another object of the invention is to provide an eyeglass frame with a pocket for removably mounting interchangeable objects, such as photographs, pictures, temples and the like.

Another object of the invention is to provide a combined eyeglass and picture frame which is simple and durable in construction and which can be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a front elevational view of an eyeglass frame embodying one form of the invention, parts being broken away.

Fig. 2 is a top plan view thereof.

Fig. 3 is an enlarged side elevational view of a part of one of the temples of the frame.

Fig. 4 is a similar view with the pocket cover removed.

Fig. 5 is an enlarged sectional view taken on the plane of the line 5—5 of Fig. 3.

Fig. 6 is an enlarged sectional view taken on the plane of the line 6—6 of Fig. 3.

Fig. 7 is a fragmentary detail view showing the hinge construction in section.

Fig. 8 is an enlarged side elevational view of part of one of the temples of the frame embodying a modification of the invention.

Fig. 9 is a similar view with part of the pocket cover broken away.

Fig. 10 is a sectional view taken on the plane of the line 10—10 of Fig. 8.

Fig. 11 is an enlarged side elevational view of part of one of the temples of the frame embodying another modification of the invention.

Fig. 12 is a similar view with the pocket cover broken away.

Fig. 13 is a sectional view taken on the plane of the line 13—13 of Fig. 11.

The ophthalmic mounting embodying the first form of the invention shown in Figs. 1 to 7, inclusive, comprises a front frame unit including a pair of upper rim portions 10 encircling the top portions of lenses 11, said rim portions being joined by a bridge member 12. The bridge member is formed with downwardly and rearwardly extending integral nose pads 13 for supporting the mounting upon the face of the wearer. The rim portions 10 are further designed so as to have integral lugs 14 in the temporal regions thereof.

Another front frame unit comprising a pair of lower rim portions 15 encircles the remaining portions of the lenses 11. The rim portions 15 are joined by an integral bridge portion 16 seated in a continuous groove 17 formed in the inner surfaces of the bridge member 12 and nose pads 13. The ends of the lower rim portions 15 are seated in grooves 18 formed in the bottom edges of the lugs 14 of the upper rim portions 10 and are secured therein by screws 19.

The spectacle frame is also provided with the usual side temple members 20 and 21 which are pivotally secured to the lugs 14 by pins 22.

The supporting structure including the upper rim portions 10, bridge member 12, nose pads 13 and temples members 20 and 21 are preferably formed of non-metallic material such as zylonite, Celluloid, Bakelite or other artificial resinous material preferably possessing a relatively noninflammable acid resisting nature which are light in weight and readily moldable or otherwise workable. It is to be understood that such material may possess any desired degree of transparency or may be opaque and may be made of any desired color or colors.

The lower front unit comprising the rim portions 15 is formed of thin metal so as not to interfere with the vision of the wearer.

According to the present invention, the eyeglass frame is constructed so as to mount an ornament for display purposes. One of the temple members, for instance, the temple member 21, at its free end, is formed with a cutout portion or pocket 23 opening rearwardly and outwardly of the free end and being in the form of a rectangular frame for detachably receiving a suitable ornament, such as a cutout photograph or picture 24 of a child, sweetheart or relative, or similar ornament. The side and inner edges of the pocket 23 are slanted for slidably receiving the side edges of the picture when the picture is being inserted into the pocket.

The picture is held in the pocket and protected against soilage and damage by a transparent cover 25 made of the same material as the temple member and connected at its inner end to the temple member by a hinge 26. The hinge includes end tubular bearing rolls 27 integrally formed on the temple member adjacent the inner end of the pocket, a central tubular bearing roll 28 on the cover and a pin 29 passing through said rolls. The central bearing roll 28 is larger in diameter than the hinge pin 29 so as to accommodate the central portion 30 of a pressure spring 31 which encircles the pin and has one end 32 extending laterally and anchored in a pocket 33 on the inner surface of the cover 25, and its other end extending laterally and wedged in the back of one of the bearings 27 whereby a continuous closing pressure is exerted upon the cover 25. The cover has a protuberance 34 which is adapted to be inserted into and interlock with a socket 35 formed on the inner surface of the outer end of the temple member 21.

In Figs. 8, 9 and 10 a modified form of temple member 36 is shown and it is intended that the other temple member of the eyeglass frame be constructed in a similar manner. In this form of the invention, the free end of the temple member 36 is formed with a cutout portion or pocket 37, the pocket opening outwardly and rearwardly to receive detachably one end of an auxiliary temple member 38, forming an extension of the main temple member 36. One end of the auxiliary temple member is formed with a series of openings 39 arranged along its center and adapted to receive a protuberance 40 on the hinged cover 41 which is adapted to be projected through said opening and into interlocking relation with a socket 42 on the outer end of the temple member 36 when the cover is closed. This arrangement permits adjustment of the eyeglass frame to fit various size heads.

The modified form of the invention shown in Figs. 11 to 13, inclusive, is similar to the form shown in Figs. 1 to 7, inclusive, except that the pocket 23' formed in the temple member 21', adjacent the free end thereof, opens laterally and outwardly of the temple member and the cover 25' is hinged to the temple member at its outer free end by a hinge 26'. The cover is releasably held in closed position by the spring 31' which has one end 32' pressing against the cover for urging the same to closed position. In this form, the picture 24' is slid in sidewise into the pocket 23'.

In all other respects, the form of the invention shown in Figs. 11 to 13, inclusive, is similar to the form shown in Figs. 1 to 7, inclusive, and similar reference numerals are used to indicate similar parts.

It is to be understood that the pockets 23 may be of any desired shape and size and could be located anywhere along the temple member 21 of the eyeglass frame. In these pockets, photographs, identification tags, paintings or any other desired material may be inserted.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

An ophthalmic mounting comprising a front frame unit for supporting lenses, flat side temple members pivotally secured at one end to the frame unit, each of said temple members having a recessed pocket formed therein, at its free end opening laterally and having a socket opening into the pocket, a spring-pressed flat cover hinged to each temple member for closing its adjacent pocket, an elongated, flat auxiliary temple member detachably and adjustably fitted in each pocket, said auxiliary temple members forming extensions of the pivoted temple members, each of said auxiliary temple members having spaced aligned openings therealong at one end, and protuberances carried by the hinged covers and adapted to be inserted through the openings in the auxiliary temple members into said sockets for releasably holding said auxiliary temple members in position.

References Cited in the file of this patent
UNITED STATES PATENTS

| | | |
|---|---|---|
| 1,591,181 | Pollmiller | July 6, 1926 |
| 1,647,107 | Franchini | Oct. 25, 1927 |
| 2,315,115 | Fischer | Mar. 30, 1943 |
| 2,443,249 | Jackson | June 15, 1948 |
| 2,568,919 | Kaye | Sept. 25, 1951 |

FOREIGN PATENTS

| | | |
|---|---|---|
| 303,716 | Great Britain | Jan. 10, 1929 |